US012596242B2

(12) United States Patent
Fahrbach

(10) Patent No.: US 12,596,242 B2
(45) Date of Patent: Apr. 7, 2026

(54) INCLINED-PLANE MICROSCOPE HAVING IMPROVED COLLECTION EFFICIENCY

(71) Applicant: LEICA MICROSYSTEMS CMS GMBH, Wetzlar (DE)

(72) Inventor: Florian Fahrbach, Mannheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 661 days.

(21) Appl. No.: 17/917,003

(22) PCT Filed: Apr. 8, 2021

(86) PCT No.: PCT/EP2021/059204
    § 371 (c)(1),
    (2) Date: Oct. 5, 2022

(87) PCT Pub. No.: WO2021/204956
    PCT Pub. Date: Oct. 14, 2021

(65) Prior Publication Data
    US 2023/0185068 A1      Jun. 15, 2023

(30) Foreign Application Priority Data

Apr. 9, 2020    (DE) ..................... 10 2020 204 615.8

(51) Int. Cl.
    *G02B 21/00*        (2006.01)
    *G02B 21/36*        (2006.01)
(52) U.S. Cl.
    CPC ..... *G02B 21/0032* (2013.01); *G02B 21/0076* (2013.01); *G02B 21/367* (2013.01)

(58) Field of Classification Search
    CPC ................................................ G02B 21/0032
    See application file for complete search history.

(56) References Cited

U.S. PATENT DOCUMENTS

| 2016/0139394 A1* | 5/2016 | Taniguchi .......... G02B 21/0088 359/392 |
| 2017/0068080 A1 | 3/2017 | Anhut et al. |

(Continued)

FOREIGN PATENT DOCUMENTS

| DE | 102016119268 B3 | 12/2017 |
| DE | 102014102215 A1 | 5/2019 |

(Continued)

*Primary Examiner* — Edmond C Lau
(74) *Attorney, Agent, or Firm* — LEYDIG, VOIT & MAYER, LTD.

(57) ABSTRACT

An inclined plane microscope includes a detection assembly for collecting scattered light and/or fluorescent light from regions of a sample volume illuminated by a light sheet, wherein the detection assembly, on its side facing away from the sample volume, is configured to image a real intermediate image of the regions of the sample illuminated by the light sheet, and wherein the real intermediate image is tilted in relation to a focal plane of the detection assembly, and an optical alignment unit for imaging a predetermined image field of the real intermediate image onto a detector, wherein the alignment unit has a depth of field region, wherein a focal plane of the alignment unit is tilted in relation to the real intermediate image, and wherein the predetermined image field of the real intermediate image to be imaged by the alignment unit is located completely within the depth of field region.

13 Claims, 4 Drawing Sheets

(56)           References Cited

U.S. PATENT DOCUMENTS

| | | | |
|---|---|---|---|
| 2019/0196172 A1 | 6/2019 | Hillman | |
| 2019/0204573 A1* | 7/2019 | Fahrbach | .............. G02B 21/008 |
| 2019/0243118 A1 | 8/2019 | Schumann | |
| 2019/0317312 A1 | 10/2019 | Hillman | |

FOREIGN PATENT DOCUMENTS

| | | | |
|---|---|---|---|
| WO | WO 2008/137746 A1 | 11/2008 | |
| WO | WO 2017/015077 A1 | 1/2017 | |
| WO | WO 2019/185174 A1 | 10/2019 | |

* cited by examiner

INCLINED-PLANE MICROSCOPE HAVING IMPROVED COLLECTION EFFICIENCY

CROSS REFERENCE TO RELATED APPLICATIONS

This application is a U.S. National Phase application under 35 U.S.C. § 371 of International Application No. PCT/EP2021/059204, filed on Apr. 8, 2021, and claims benefit to German Patent Application No. DE 10 2020 204 615.8, filed on Apr. 9, 2020. The International Application was published in German on Oct. 14, 2021, as WO 2021/204956 A1 under PCT Article 21(2).

FIELD

Embodiments of the present invention related to inclined plane microscopes, methods for using inclined plane microscopes, and methods for recording images representing planes of a sample.

BACKGROUND

In inclined plane microscopes, for example, an OPM or a SCAPE microscope, an alignment unit is used by means of which an image imaged by the microscope of a plane of the sample obliquely illuminated by the light sheet is imaged sharply on a detector, i.e., is aligned. It is problematic in an alignment unit that a large part of the sample light collected by the objective facing toward the sample does not reach the detector.

To completely dispense with an inclined arrangement of the alignment unit, in which the optical axis of the alignment unit is perpendicular to the real intermediate image, the depth of field would have to be very strongly increased for large image fields. In such a case, the optical axes of the detection assembly and the alignment unit can extend collinear to one another, which results in a simple structure of the entire system. In this approach followed in the prior art, the alignment unit therefore de facto no longer aligns the inclined real intermediate image and merely represents an imaging optical unit. A strong increase of the depth of field required for this purpose is, however, very demanding with respect to the correction which corrects the artifacts accompanying this increase and can result in problems. If the inclination of the alignment unit is dispensed with, the optical axes of the detection assembly and the alignment unit extend collinear or in parallel to one another.

SUMMARY

In an embodiment, the present disclosure provides an inclined plane microscope comprising a detection assembly for collecting scattered light and/or fluorescent light from regions of a sample volume that are illuminated by a light sheet, wherein the detection assembly, on its side facing away from the sample volume, is configured to image a real intermediate image of the regions of the sample that are illuminated by the light sheet, and wherein the real intermediate image is tilted in relation to a focal plane of the detection assembly, and an optical alignment unit for imaging a predetermined image field of the real intermediate image onto a detector, wherein the alignment unit has a depth of field region, wherein a focal plane of the alignment unit is tilted by an offset angle in relation to the real intermediate image, and wherein the predetermined image field of the real intermediate image to be imaged by the alignment unit is located completely within the depth of field region.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
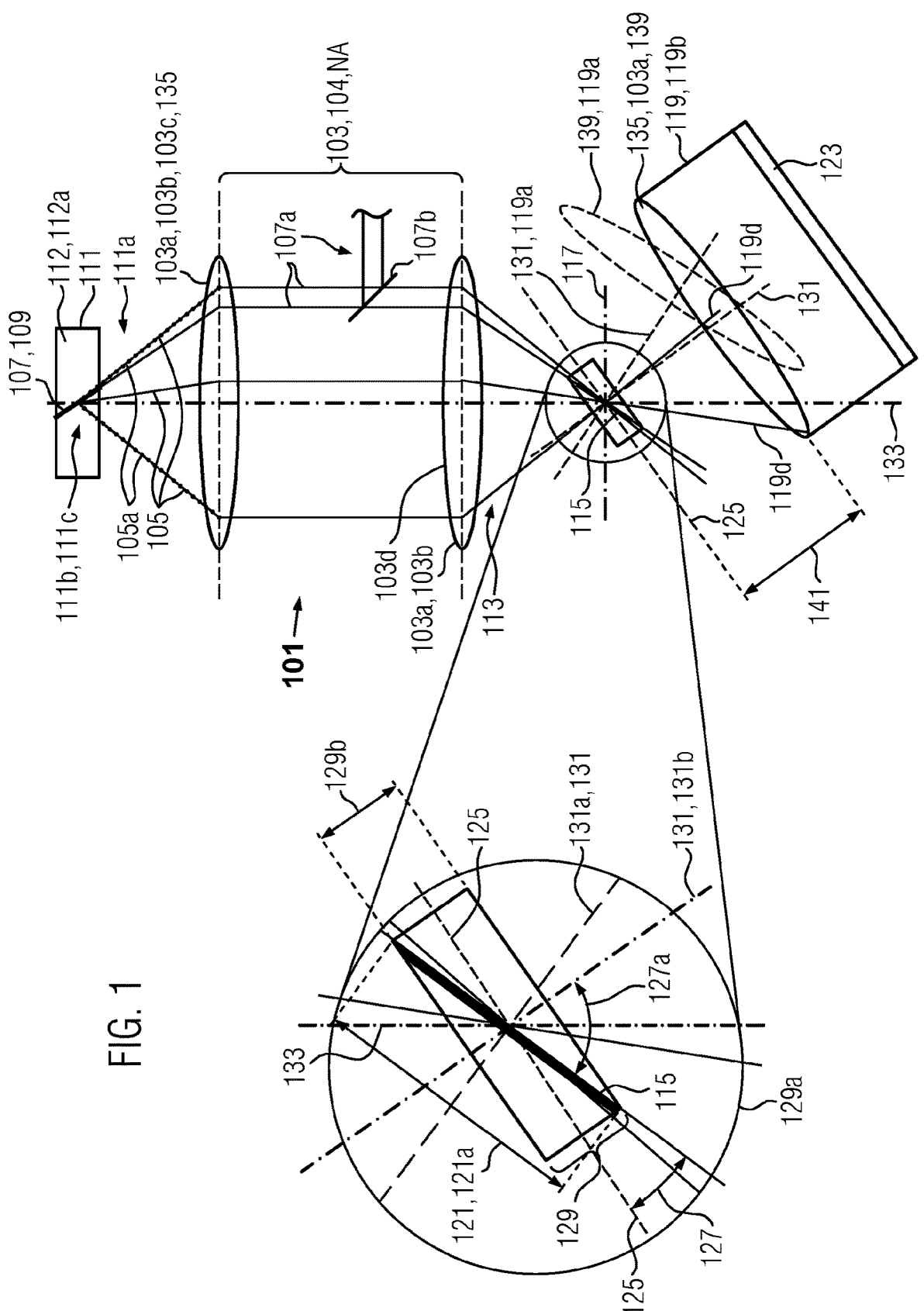
FIG. 1 shows a schematic illustration of the inclined plane microscope according to an embodiment of the invention.

Embodiments of the invention relate to an inclined plane microscope comprising a detection assembly for collecting scattered light and/or fluorescent light from regions of a sample volume that are illuminated by a light sheet, wherein the detection assembly is designed, on its side facing away from the sample volume, to image a real intermediate image of the regions of the sample that are illuminated by the light sheet, and wherein the real intermediate image is tilted in relation to a focal plane of the detection assembly, and an optical alignment unit for imaging a predetermined image field of the real intermediate image on a detector, wherein the alignment unit has a depth of field region. Furthermore, embodiments of the invention relate to a method for recording images representing planes of a sample, comprising the collection of scattered light and/or fluorescent light from regions of a sample volume that are illuminated by a light sheet using a detection assembly, generating a real intermediate image of the regions of the sample volume that are illuminated by the light sheet using the detection assembly, wherein the real intermediate image is tilted in relation to a focal plane of the detection assembly, and imaging a predetermined image field of the real intermediate image on a detector by way of an optical alignment unit. Furthermore, embodiments of the invention relate to the use of an alignment unit in an inclined plane microscope for imaging a predetermined image field of a real intermediate image generated by a detection assembly on a detector, wherein the real intermediate image is tilted in relation to a focal plane of the detection assembly and wherein the alignment unit has a depth of field region.

In an embodiment, the present invention provides an inclined plane microscope and a method which permit the light yield to be increased.

Advantages of embodiments of the present invention are achieved in that a focal plane of the alignment unit is tilted by an offset angle in relation to the real intermediate image, and that the predetermined image field of the real intermediate image to be imaged by the alignment unit is located completely within the depth of field region of the alignment unit.

In an embodiment, the present invention accordingly achieves the aforementioned advantages by the tilting of a focal plane of the alignment unit by an offset angle in relation to the real intermediate image, wherein the predetermined image field of the real intermediate image is located completely within a depth of field region of the alignment unit. According to an embodiment of the invention, the alignment unit is used in an inclined plane microscope, wherein a focal plane of the alignment unit is tilted by an offset angle in relation to the real intermediate image, and wherein the predetermined image field of the real intermediate image to be imaged by the alignment unit is located completely within the depth of field region.

In an embodiment, the invention therefore has the advantage that the tilting of the alignment unit by an offset angle in relation to the real intermediate image enables the alignment unit to be arranged closer to the optical axis of the detection assembly and the angle between the optical axes of detection assembly and alignment unit to be reduced. This in turn permits more scattered light and/or fluorescent light to be collected using the alignment unit without, for example, having to modify optical components of the alignment unit. Moreover, an increased possible tilt of the alignment unit enhances the simpler replacement thereof and thus the flexibility of the inclined plane microscope.

In some embodiments, the present invention thus improves inclined plane microscopes and methods from the prior art which are subject to a restriction of the resolution in that the full aperture of the detection assembly cannot be tapped using the alignment unit. In some embodiments, the invention also improves solutions from the prior art with respect to their flexibility. In contrast to known solutions, objective changes can be carried out in practice with some embodiments of the invention.

For example, in the solutions from the prior art, there is also no or only restricted compatibility with cover slips. These simply cannot be added easily to the optical structure, for example, without noticeably worsening the measurement. In the inclined plane microscope according to some embodiments of the invention, in contrast, cover slips can be used without noticeably worsening the quality of the measurement.

The inclined plane microscope according to some embodiments of the invention or the method according to some embodiments of the invention can be further improved by the embodiments described hereinafter. The additional features described hereinafter of the inclined plane microscope or method steps of the method can be combined arbitrarily with one another. Device features can be transferred to a corresponding method according to embodiments of the invention, and method features can be transferred to a corresponding device for this purpose.

The concept of the "detection assembly" is to be understood in the context of this disclosure as an optical assembly which permits scattered light and/or fluorescent light to be collected from regions of a sample volume illuminated by a light sheet. In further embodiments, such a detection assembly can also be used simultaneously for illuminating the sample. For this purpose, a beam path of the illumination light and a beam path of the detection light (scattered light/fluorescent light) can extend in different regions of the detection assembly.

Since a light sheet formed inclined in the sample in relation to the optical axis of the detection assembly also results in a real intermediate image imaged inclined in relation to the optical axis of the detection assembly, which is to be imaged as sharply as possible on a detector, the optical assembly imaging the real intermediate image is aligned inclined in relation to the optical axis of the detection assembly. The optical axis of this imaging optical assembly is preferably perpendicular to the real intermediate image here in order to achieve the sharp imaging. This imaging optical assembly is typically referred to as an "alignment unit", since the inclined arrangement of the alignment unit aligns the real intermediate image in this perpendicular position.

The "depth of field region" is an axial extension, within which a pixel to be imaged can be located, without the imaging of this pixel on a detector resulting in a scattering circle which is larger than a permissible scattering circle. The permissible scattering circle is defined in this case, inter alia, by the detector used (for example with the aid of the pixel dimensions) and characterizes a maximum size of a circular image which can still be sharply imaged using this detector.

The alignment unit is preferably tilted toward an optical axis of the detection assembly, wherein in spite of the tilt the depth of field region of the alignment unit completely comprises or encloses the image field to be imaged of the real intermediate image. In particular, the real intermediate image can be arranged diagonally in the depth of field region. The possible tilt of the alignment unit toward the optical axis of the detection assembly is thus determined by the width of the image field to be imaged and by the depth of field region of the alignment unit. The width of the image field to be imaged is measured perpendicularly to the optical axis of the detection assembly.

If the real intermediate image is thus located within the depth of field region, it can preferably be imaged without information loss on the detector. However, an increased proportion of the scattered light and/or fluorescent light is collected by the alignment unit due to the tilt in this case. This permits a signal-to-noise ratio to be increased and measurements to be carried out faster.

An optical axis of the alignment unit can be tilted toward the optical axis of the detection assembly for this purpose.

The alignment unit can have at least one immersion optical unit. This has the advantage that an optical medium adapted to the index of refraction of the alignment unit, for example a liquid, is arranged between the alignment unit and the real intermediate image, which enlarges an acceptance angle of the alignment unit in which light can be absorbed thereby. This acceptance angle is described by the numerical aperture (NA).

According to an embodiment of the invention, a tilt of the alignment unit around the offset angle is thus enabled by providing and/or enlarging the depth of field region of the alignment unit. A possibility of increasing the depth of field region of the alignment unit is to generate aberrations increasing the depth of field, in particular spheric aberrations, in the alignment unit. These can be generated, for example, by a mismatch of the detection assembly to an index of refraction, for example of an immersion medium. Thus, for example, if an immersion optical unit is used without an immersion medium or with an unmatched immersion medium, the depth of field of the alignment unit can be increased by the mismatch of the alignment unit.

The alignment unit can also have a phase mask and/or an amplitude mask to enlarge the depth of field region. Both the phase mask and the amplitude mask can be arranged in the pupil of the alignment unit so that they can be referred to as pupil filters. An annular amplitude mask or phase mask in which the phase delay is linearly dependent on the radius (the radius is the distance to the optical axis of the alignment unit) can modify, for example, the so-called point spread function (PSF) of the alignment unit so that it receives the cross section of a Bessel function. In addition to a linear dependence of the phase delay on the radius, for example, quadratic, cubic, and quartic phase masks can also be used. The phase or amplitude mask also does not have to be rotationally symmetrical. A linear, rotationally symmetrical phase mask can transform the PSF into a form which corresponds to a Bessel beam (i.e., the cross section of the PSF follows a Bessel function or can approximately be described thereby). The depth of field is increased here. A cubic, non-rotationally symmetrical phase mask can generate a PSF which corresponds to an Airy beam and also has an increased depth of field. A pupil filter can thus transform a diffraction limited PSF such that an increased depth of field and an accompanying reduced axial resolution are obtained. The reduced axial resolution is ideally not connected here to a corresponding loss of the lateral resolution.

In an embodiment of the inclined plane microscope according to the invention, the alignment unit can comprise at least one lens, the positioning of which relative to the intermediate image deviates from a position in which the alignment unit generates the least spherical aberrations upon the imaging of the intermediate image. An aberration-minimized arrangement/position can be calculated or found for each lens and also for each lens system. The refractive power is distributed onto as many surfaces of the optical units as possible therein, for example. A variation of the position of the lens thus results in a no longer aberration-minimized arrangement/position. This is to be referred to hereinafter as an aberration-subjected arrangement and comprises any arrangement/position of the lens/the lens system deviating from the aberration-minimized arrangement/position. To achieve an aberration-subjected arrangement/position for this embodiment, the position of the detector relative to the alignment unit can be displaced along the optical axis of the alignment unit in comparison to the aberration-minimized arrangement/position to position the detector in or close to the image plane of the alignment unit.

For example, the alignment unit (and thus also its lenses) can also be arranged at a working distance from the real intermediate image which deviates from the free working distance defined by the alignment unit (if this is set, an aberration-minimized arrangement/position is thus provided). The defined free working distance is to be understood as that working distance for which the alignment unit has the least spheric aberrations. The occurring spheric aberrations upon setting this arbitrary working distance increase the depth of field region of the alignment unit, which enables tilting of the alignment unit.

An alignment unit could comprise, for example, at least two lenses. If such a lens system is optimized so that spherical aberrations are minimal when the real intermediate image is located in a front focal plane of a front lens, it is advantageous if the working distance to the real intermediate image is selected so that it deviates from the focal length of the front lens, thus is greater, for example. The designations "forward" or "front" are related to a direction from the alignment unit to the real intermediate image. The front lens is therefore arranged closer to the real intermediate image than the further one of the two lenses. In case of a greater working distance, this procedure therefore also enables the use of larger objectives. The imaged plane (object plane) is located further away from the first lens in comparison to the focal plane here. As in the example previously described, such an alignment unit results in an increase of the spherical aberrations and therefore an increase of the depth of field, which in turn permits tilting of the alignment unit.

In general, the alignment unit can be designed so that spheric aberrations occur, but other imaging errors (such as chromatic aberrations, distortion, vignetting, etc.) are substantially avoided. For example, this can be taken into consideration in the optical design of the properties of the objective, since imaging errors can generally be corrected separately from one another.

Furthermore, the alignment unit can comprise a microlens array. Such a microlens array has a greater depth of field region due to a plurality of lenses having small diameter and large numeric aperture than a single lens having the same entry area as the microlens array.

In particular, in an embodiment of the inclined plane microscope according to the invention, a detector can be provided which has a plurality of pixels that have a pixel size which is equal to or less than half of a scattering circle diameter, wherein the scattering circle diameter results from the depth of field region, the focal length and the f-stop of the alignment unit, and its working distance to the real intermediate image.

The scattering circle diameter, i.e., the diameter of a scattering circle determines in conjunction with the size of a pixel whether an object is sharply imaged on the detector or not. If an object point (sample-side point) is located—upon observation in the geometrical optical unit—in an object plane of a lens, light originating from this point is thus focused in the associated image plane in a pixel. A detector placed in this plane detects a sharp image. If the object point should no longer be located in the original object plane of the lens, the light cone originally converging in the image plane is cut off, for example, and a scattering circle results on the detector.

If one observes a diffraction-limited optical image, the so-called Airy disk (the cross section perpendicular to the optical axis through the PSF) represents the smallest possible image of a sample-side point. A point in the object to be imaged (thus the sample) becomes an Airy disk (or the PSF in general) in the image.

According to an embodiment of the invention, in the above-described embodiment, the detector is therefore selected such that the scattering circle corresponds to a maximum tolerable scattering circle diameter, so that a sharp image is obtained.

The depth of field of the optical system is typically variable via the f-stop, which describes the ratio of the focal length of an optical system to the diameter of its entry pupil (the aperture), wherein the depth of field is directly proportional to the f-stop. The f-stop relates to the image side of an optical system and can also be calculated from an image-side opening angle.

In contrast thereto, the optical system can also be described by the numeric aperture (NA), which results from the product of the sine of half the object-side opening angle and the index of refraction of the medium between objective and focus. Both dimensions, f-stop and NA, can be related to one another by the lens equation.

In this embodiment, a sharp image of the real intermediate image within the depth of field region is therefore possible solely due to the geometry of the detector and its pixels and the scattering circle diameter achieved using the alignment unit.

Due to an increase of the depth of field of the alignment unit, the point spread function (PSF) can deform. Such a deformed PSF can be incorporated into the PSF of the entire system, i.e., can be taken into consideration in the image processing. For example, the images of an image stack can be unfolded by means of the deformed PSF. The deformed PSF can be location variant within a recorded image due to the tilt and is not only dependent on the illumination. A relative position of a detection PSF and an illumination PSF varies over the image field due to the tilt. In one embodiment of the method according to the invention, artifacts can be reduced by unfolding the recorded images using a modified PSF. Alternatively or additionally, a further reduction of artifacts can be achieved by further computer-assisted image improvement methods (for example by so-called "Computational Clearing" as described in WO 2019/185174 A1).

In summary, the above-mentioned aberrations increasing the depth of field can be generated by a mismatch of the index of refraction, by pupil filters, or by an aberration-subjected arrangement of the alignment unit. In the latter case, for example, a non-telecentric system can be used. Such a system is characterized, when the alignment unit consists of two lenses (objective and tube lens), in that these two lenses are not arranged at a distance from one another that corresponds to the sum of their focal lengths. In general, the plane to be imaged by the alignment unit on the detector can be located farther away from the alignment unit than its focal plane, i.e., the working distance can be increased and the alignment unit can be tilted more toward the optical axis of the detection assembly, without abutting the detection assembly.

In addition to the additional possible postprocessing steps of computational clearing or unfolding the recorded images using the modified PSF, in an embodiment of the method according to the invention, a resorting of recorded image data can be carried out, so that each obtained image represents a plane which is oriented perpendicularly to the optical axis of the detection assembly. Such resorting has the advantage that the obtained images are intuitively comprehensible for the user and enable an easier interpretation of the content with respect to the location of the represented structures in the sample.

A postprocessing step can be used to compensate for recorded artifacts, which are induced by the increase of the depth of field. The system PSF intrinsic to the inclined plane microscope corresponds to a product of the PSF of the illumination and the PSF of the detection and can be used for the unfolding. This has the special feature that illumination and detection are neither collinear nor perpendicular to one another. The postprocessing steps can also be combined with one another thus, for example, after the resorting of the recorded image data, the image thus obtained of the plane can in each case be unfolded using a single (correspondingly rotated) system PSF. A homogeneous fuzziness can moreover be presumed in these planes, which can be taken into consideration in the image processing.

In inclined plane microscopes (OPM/SCAPE), the illumination and the detection do not necessarily have to be perpendicular to one another. The illumination can therefore partially extend in the detection light cone. If illumination and detection are not perpendicular to one another, the detection can then take place under certain circumstances at least partially in a direction which is opposite to the illumination. Therefore, the light sheet illuminating the sample can enclose the detection light cone in a region outside the depth of field of the alignment unit in the sample. Since the detection partially takes place in the opposing illumination direction, the optical sectioning can decrease here. This can result in a loss of contrast. The computational clearing and/or optical clearing of the sample can be particularly advantageous in this case, since these two methods enable this loss of contrast to be compensated for or prevented.

The inclined plane microscope according to an embodiment of the invention and the method according to an embodiment of the invention permit a simple change of the detection assembly, so that an illumination beam can also be coupled into the detection assembly for a detection assembly having a larger or smaller aperture at the edge of the pupil. In this way, the angle between light sheet and optical axis can change. As long as the angle change of the light sheet in relation to the optical axis and an angle change of the real intermediate image resulting therefrom remain within the depth of field region of the alignment unit, no additional fuzziness of the recorded images occurs due to a change of the detection assembly.

Furthermore, a penetration depth in the sample can be varied by a change of the tilt angle of the light sheet in the sample. In some applications, it can be desirable to tilt the image plane by different amounts in relation to the optical axis. This is typically not practical in the prior art, since in this case the alignment unit including the detector would also have to be rotated, which is very complex while maintaining an optimal alignment. An increased depth of field according to the inclined plane microscope or the method of embodiments of the present invention provides leeway with respect to the tilting of the alignment unit in relation to the optical axis, however, and enables the change of the tilt angle.

The possibility of increasing the offset angle between detection assembly and the real intermediate image is advantageous in particular if the image quality is maintained, thus no reduction of the numeric aperture of the alignment unit is required for this purpose, since on the one hand this results in a lower light yield, and also is accompanied by a lower resolution. If the numeric aperture of the alignment unit can be maintained, a higher light yield is achieved even if no increase of the resolution is possible.

The detector used in the inclined plane microscope according to an embodiment of the invention or in the method according to an embodiment of the invention can be a camera (CCD, CMOS, etc.) known from the prior art. In general, an increase of the depth of field of an alignment unit of an inclined plane microscope results in a lower axial resolution of this alignment unit. According to an embodiment of the invention, it can therefore be advantageous to compensate for an axial resolution decreased by the increase of the depth of field by way of postprocessing steps. Even if this compensation does not result in an improvement of the resolution, an increased light yield is enabled due to the tilt of the alignment unit. The compensation for a reduced axial resolution of the alignment unit is advantageous in particular since this decisively determines the resolution of the inclined plane microscope (OPM/SCAPE).

Solely by way of example, an embodiment of the present invention enables a tilt of the alignment unit by approximately 8° with an image field of 20 μm and for 5 μm depth of field. Such a possible tilt can already prevent a collision of the detection assembly with the alignment unit.

The increase described in some embodiments or the addition of spheric aberrations has the result that high spatial frequencies are still transmitted in the region of the sample to be imaged, but are damped more strongly due to a modulation transfer function (MTS) changed by the spheric aberrations. In the postprocessing step (preferably only) these spatial frequencies can be amplified, for example, by the unfolding using the modified PSF, and therefore the higher spatial frequencies can be delimited more strongly from the noise, so that they are not entirely covered by noise. Denoising before the unfolding is also conceivable.

The term "and/or" comprises all combinations of one or more of the associated listed elements and can be abbreviated by "/".

Although some aspects have been described in the context of a device, it is clear that these aspects also represent a description of the corresponding method, wherein a block or a device corresponds to a method step or a function of a method step. Similarly thereto, aspects which are described in the context of a method step also represent a description of a corresponding block or element or a property of a corresponding device.

Embodiments of the present invention are to be explained in more detail hereinafter on the basis of appended drawings. The embodiments illustrated in the drawings merely represent exemplary embodiments of the invention, wherein the features described in the drawings can be combined with one another arbitrarily or omitted, if the technical effect achieved by the omitted features is not important.

Identical technical features shown in the figures and technical features of identical function are described by identical reference signs. In this case, the prefixed hundreds digit identifies the figure in which said feature is described first. If not explicitly excluded, features mentioned the first time can also be used in previously mentioned figures in higher ranking figures. Such a combination represents a further embodiment of the invention.

FIG. 1 shows an inclined plane microscope 101 in a schematic illustration. The inclined plane microscope 101 comprises a detection assembly 103, by means of which scattered light and/or fluorescent light 105 is collected from regions 109 of a sample volume 111 that are illuminated by a light sheet 107.

The light sheet 107 is formed by illumination light 107a focused in the sample volume 111. The illumination light 107a can be introduced, for example, via a mirror assembly 107b into the inclined plane microscope 101. The coupling of the illumination light 107a is shown solely as an example and can take place at other points into the inclined plane microscope 101 in other embodiments.

The detection assembly 103 images the regions 109 of the sample 111b illuminated by the light sheet 107 on a side 113 facing away from the sample volume 111 in a real intermediate image 115.

This real intermediate image 115 is tilted with respect to a focal plane 117 of the detection assembly 103.

The detection assembly 103 is shown solely as an example by two lenses 103a. In other embodiments, these lenses 103a shown here can also each be an objective 103b. The lens 103a which faces toward the sample volume 111 can be an immersion optical unit 135.

A lens 103a can be a first detection optical unit 103c, which collects the scattered light and/or fluorescent light 105 originating from a sample side 111a. The detection assembly 103 can be a telescope 104 and can furthermore comprise a second detection optical unit 103d pointing toward the side 113 facing away from the sample volume 111.

Furthermore, the inclined plane microscope 101 comprises an optical alignment unit 119, by means of which a predetermined image field 121 of the real intermediate image 115 is imaged on a detector 123.

The predetermined image field 121 is shown solely schematically one-dimensionally as a width 121a but can also be understood as a two-dimensional surface which additionally protrudes into or out of the plane of the drawing. This two-dimensional surface is defined by the width 121a shown and a depth.

The real intermediate image 115 can extend beyond the predetermined image field 121.

The alignment unit 119 has a depth of field region 129, which is schematically shown as a rectangle in the enlarged area 129a. The depth of field region 129 also protrudes into or out of the plane of the drawing and can be understood as a cuboid. All points located within this cuboid can be sharply imaged on the detector 123 by the alignment unit 119.

The depth of field region 129 is therefore defined by the predetermined image field 121 and a depth of field 129b.

It is to be noted at this point that the depth of field region 129 shown here is to be understood as that three-dimensional region within which the predetermined image field 121 of the real intermediate image 115 is supposed to be located to obtain tolerable image data using the detector 123. These tolerable image data can either be achieved directly by the alignment unit 119, in that a maximum tolerable scattering circle of the imaged predetermined image field is achieved on the detector, which permits sharp imaging at a given pixel size, or indirectly by imaging of the alignment unit 119 and downstream postprocessing steps of the recorded data, in which the system-intrinsic characteristics are taken into consideration to optimize the recorded image data. These are, for example, the so-called point spread function (PSF) of the alignment unit 119.

The alignment unit 119 is schematically shown having a front lens 139. In a classic arrangement 119a of the alignment unit 119, i.e., in an arrangement from the prior art, an optical axis 131 of the alignment unit 119 is generally oriented perpendicularly to the real intermediate image 115. The invention deviates from the perpendicular arrangement and the optical axis 131 of the alignment unit 119 and the real intermediate image 115 are oriented at an acute angle 127a in relation to one another. This represents positioning 119b of the alignment unit 119 or 131b of the optical axis 131 according to an embodiment of the invention.

The front lens 139 or the corresponding optical axis 131 are shown by dashed lines in the classic arrangement 119a or 131a, respectively, whereas the optical axis 133 of the detection assembly 103 is shown by a dot-dash line.

In the inclined plane microscope 101 according to an embodiment of the invention shown in FIG. 1, the focal plane 125 of the alignment unit 119 is tilted by an offset angle 127 in relation to the real intermediate image 115. The offset angle 127 is shown in the enlarged region 129a.

As can be seen in the enlarged region 129a, the predetermined image field 121 of the real intermediate image 115 to be imaged by the alignment unit 119 is located completely within the depth of field region 129.

In comparison to the classic arrangement 119a, the alignment unit 119 is thus located according to an embodiment of the invention in a tilted arrangement or in the positioning 119b according to an embodiment of the invention.

This tilted arrangement 119b can be assumed by the alignment unit 119, since up to this arrangement 119b, i.e., up to the offset angle 127, the real intermediate image 115 is located arranged diagonally in the depth of field region 119. In the arrangement shown, the optical axis 131 of the alignment unit 119 is tilted toward the optical axis 133 of the detection assembly 103.

The alignment unit 119 is arranged remotely at a working distance 141 from the real intermediate image 115. This is shown for the alignment unit 119 in the tilted arrangement 119b.

Furthermore, a sample-side detection light cone 105a is schematically shown in FIG. 1. This sample-side detection light cone 105a is shown by a dotted line on the sample side 111a and can be defined, for example, by the first detection optical unit 103c. Since the first detection optical unit 103c can also be an immersion optical unit 135, the sample-side detection light cone 105a can be enlarged within certain limits. This sample-side detection light cone 105a therefore determines the maximum amount of scattered light and/or fluorescent light 105 that can be detected, i.e., collected, by the detection assembly 103. This is determined, for example, by a numeric aperture NA of the detection assembly 103.

Figures 2, 3, 4:
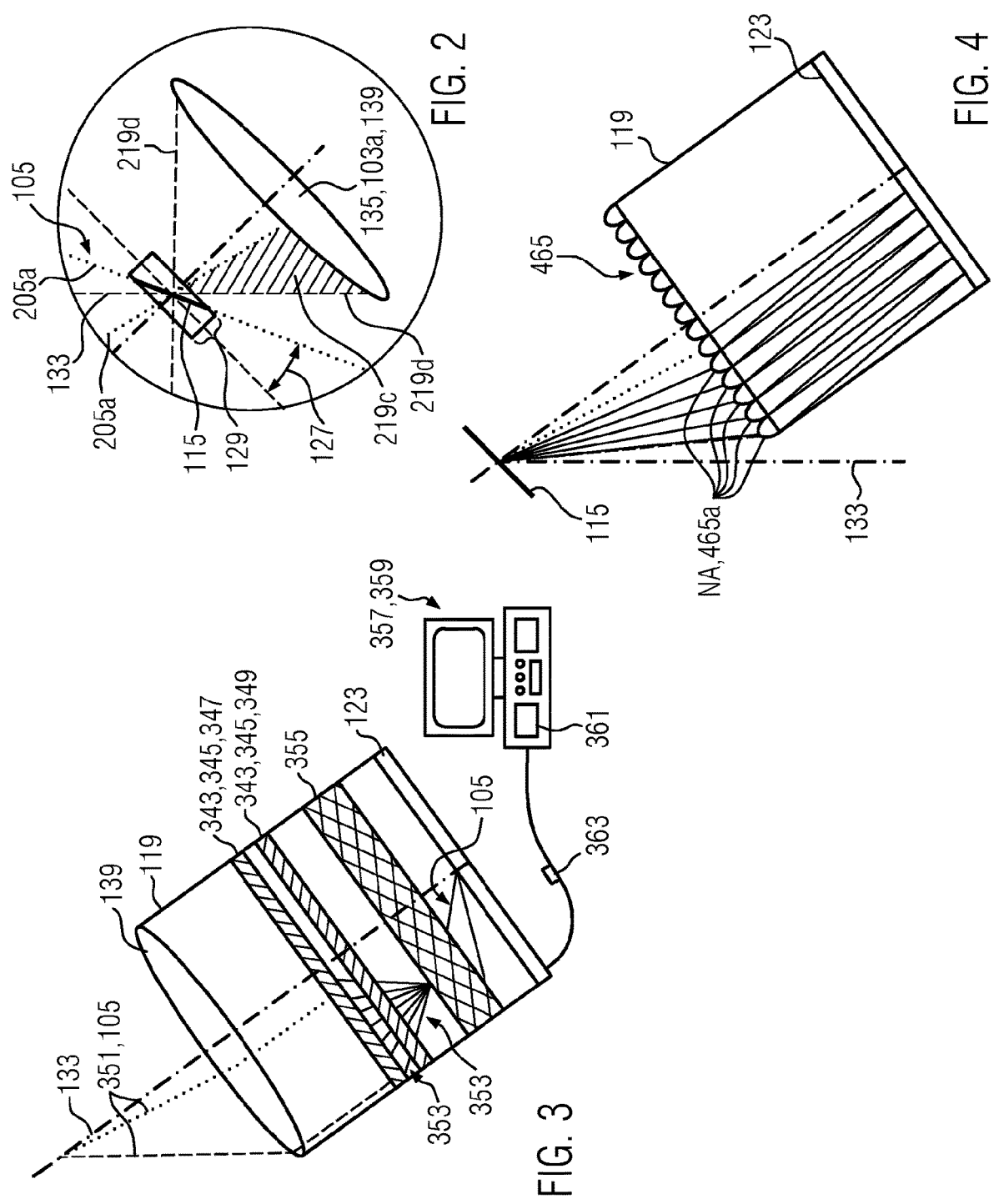
FIG. 2 shows a detail of the schematic illustration of FIG. 1.
FIG. 3 shows an embodiment of an alignment unit according to the invention.
FIG. 4 shows an embodiment of an alignment unit according to the invention.

FIG. 2 shows the region of the real intermediate image 115 in a detail illustration, which schematically shows a separate circular detail of the front lens 139 and of the depth of field region 129. Due to the necessity of arranging the alignment unit 119 tilted in relation to the optical axis 133 of the detection assembly 103, the alignment unit 119 only permits the collection of scattered light and/or fluorescent light 105 from a second detection light cone 219c. This results as the intersection between the image-side detection light cone 205a of the detection assembly 103 and a (theoretical) light cone 219d of the alignment unit 119.

In FIG. 2, the theoretical light cone 219d of the alignment unit 119 is shown by a dashed line, the image-side detection light cone 205a is shown by a dotted line, and the resulting second detection light cone 219c is shown as a shaded area. As is apparent in FIG. 1 by comparing the location of the front lens 139 in the classic arrangement 119a or the positioning 219b according to an embodiment of the invention, the second detection light cone 219c and thus the amount of the scattered light and/or fluorescent light 105 incident on the detector 123 can be enlarged by way of the offset angle 127, i.e. by tilting the alignment unit 119 toward the optical axis 133 of the detection assembly 103. In FIG. 2, the alignment unit is located in the positioning 119b according to an embodiment of the invention.

Figure 5:
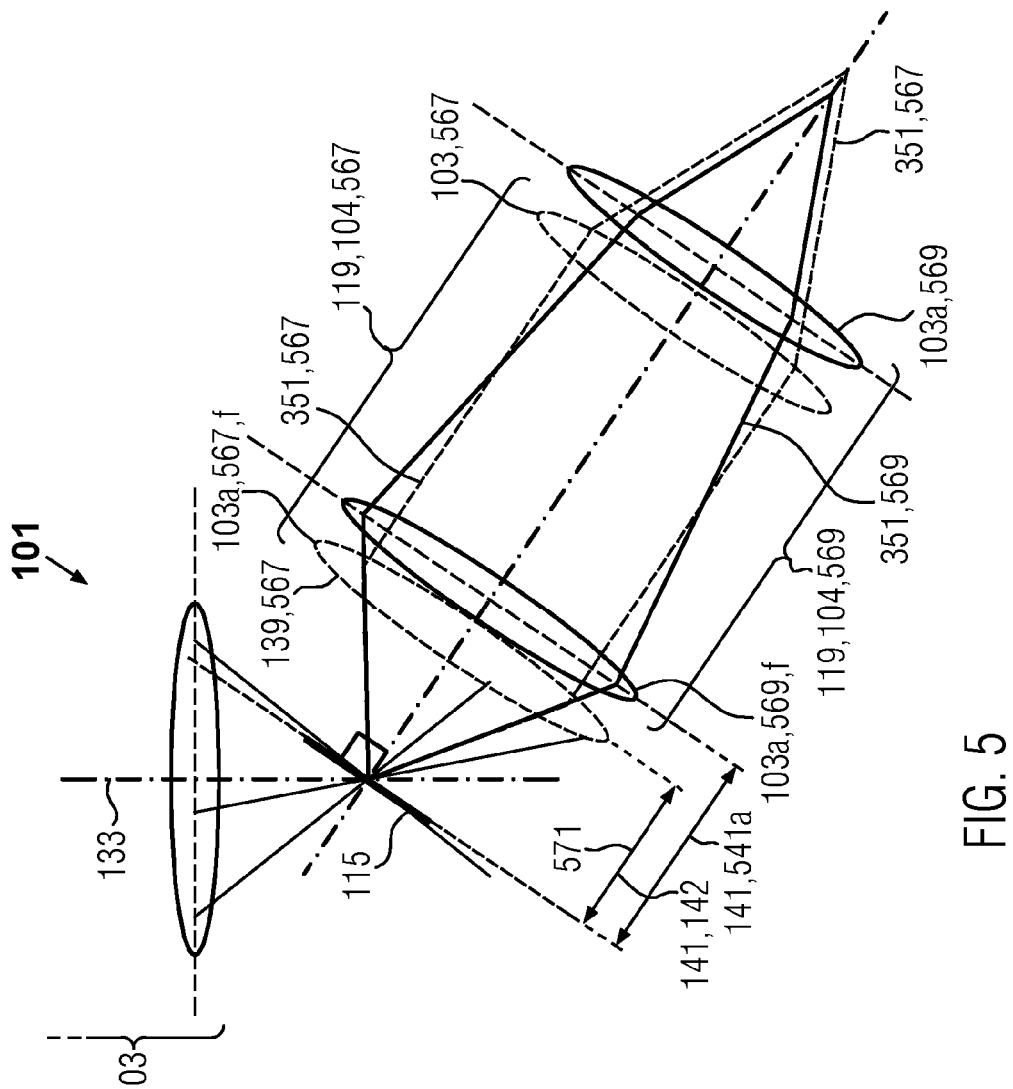
FIG. 5 shows a schematic illustration of an embodiment of an inclined plane microscope according to the invention.

As shown in FIG. 2, the offset angle 127 decisively determines which component of the scattered light and/or fluorescent light 105 can be located in the second detection light cone 219c and can be available for detection. Solutions according to an embodiment of the invention are shown in FIGS. 3, 4, and 5, which enable an enlargement of the depth of field region 129, which in turn permits an enlargement of the offset angle 127. These solutions therefore enable the alignment unit 119 to be tilted more toward the optical axis 133 of the detection assembly 103, by which a greater light yield can be achieved and the signal-to-noise ratio can be improved.

An embodiment of the alignment unit 119 according to an embodiment of the invention is shown in FIG. 3. This comprises, in addition to the front lens 139, two filters 343, wherein both filters 343 can be pupil filters 345. One of the filters 343 is a phase mask 347, whereas the other filter 343 is an amplitude mask 349.

The filters 343 modify a beam path 351 of the scattered light and/or fluorescent light 105, so that a modified beam path 353 results. This is shown schematically, solely as an example, and non-restrictively both after the phase mask 347 and after the amplitude mask 349. Furthermore, in a region identified by shading, further optical elements 355 are indicated, which image the scattered light and/or fluorescent light 105 on the detector 123.

Solely by way of example, beam curves of the scattered light and/or fluorescent light 105 can be generated using the phase mask 347, which have a PSF which is Bessel-shaped or Airy-shaped. That is to say, the PSF are describable by a Bessel function or an Airy profile. For this purpose, the phase mask 347 has a linear (Bessel) or a cubic (Airy) curve of the phase change as a function of a location coordinate. This change of the beam curves causes an enlarged depth of field region 129, which in turn enables an enlargement of the possible offset angle 127.

Furthermore, a PC 357 is shown in FIG. 3, which is shown as representative of an evaluation device 359. A microcontroller or, for example, an integrated circuit can also be used. The PC 357 is designed to process image data 363 recorded by the detector 123 by means of postprocessing modules 361 and, for example, to unfold the recorded images using a modified PSF and/or to optimize them by means of computational clearing and/or to process the image data in such a way that each newly calculated image represents a plane which is oriented perpendicular to the optical axis 133 of the detection assembly 103. Furthermore, the sample 111b shown in FIG. 1 can be optically clarified, i.e., adapted with respect to its refractive index 111c to a second refractive index 112a of an ambient medium 112. These method steps, individually or in combination, reduce the occurrence of artifacts and can improve the measurement. Furthermore, resorting of the image data, so that each obtained image represents a plane which is oriented perpendicular to the optical axis 133 of the detection assembly 103, makes it possible that these obtained images are intuitively comprehensible, since they show a plane in the sample 111b which is not inclined.

FIG. 4 shows a further embodiment of the alignment unit 119 according to an embodiment of the invention, which comprises a microlens array 465. The microlens array 465 has an enlarged depth of field region 129 (see FIG. 1) due to the numeric aperture NA of each of the individual microlenses 465a and thus enables tilting of the alignment unit 119 toward the optical axis 133 of the detection assembly 103. The image of a single point of the real intermediate image 115 is indicated solely schematically in FIG. 4. Furthermore, in the embodiment of the alignment unit 119 shown in FIG. 4, the filters 343 of FIG. 3 can also be used. Vice versa, microlenses 465a can also be used as the phase mask 347 in the embodiment according to FIG. 3.

A further possibility for increasing the depth of field region 129 of the alignment unit to enable a further tilt toward the optical axis 133 of the detection assembly 103 is shown in FIG. 5. An embodiment of the inclined plane microscope 101 according to an embodiment of the invention is schematically shown here.

In the embodiment shown, the inclined plane microscope 101 comprises an alignment unit 119 which is designed as a telescope 104.

Two possible arrangements of the telescope 104 are shown in FIG. 5, wherein these possible positions of the telescope 104 and the resulting beam paths 351 can be distinguished by the lines used, continuous or dashed, respectively.

In the embodiment of the alignment unit 119 shown in FIG. 5, the two lenses 103a are arranged in the prior art so that the front lens 139 is located at the working distance 141 to the real intermediate image 115. This working distance 141 corresponds to a free working distance 142. The free working distance 142 defines the working distance 141 for which the telescope 104 is optimized, i.e., that imaging can take place with the least possible optical errors at a working distance 141 which corresponds to the free working distance 142.

Imaging at a working distance 141 deviating therefrom enlarges the spheric aberrations occurring upon the imaging.

The spheric aberrations are utilized to increase the depth of field region 129. Artifacts thus possibly occurring can be compensated for or at least reduced by means of postprocessing. Such an arrangement, in which the working distance 141 does not correspond to the free working distance 142, is shown by a dashed line in FIG. 5, wherein reference sign 567 describes the calculated optimum position of the corresponding element, for example, of the lenses 103a or the beam path 351.

However, if an actual working distance 541a is selected as the working distance 141, which is greater than the free working distance 142, an achieved depth of field 129b is increased due to increasingly occurring spherical aberrations of the telescope 104 in such a changed position 569 and therefore an enlarged depth of field region 129 results. This in turn permits a greater tilt of the alignment unit 119 in the changed position 569 toward the optical axis 133 of the detection assembly 103.

In FIG. 5, the free working distance 142 in the calculated optimal position 567 corresponds to a focal length 571 (also: f) of the front lens 139. In contrast, the actual working distance 541a in the changed position 569 of the alignment unit 119 is greater than the focal length 571 of the front lens 139.

In some embodiments of the alignment unit, the beam path 351 can extend non-collimated between the two lenses 103a shown. In such a case, i.e., such an arrangement, it is also possible according to an embodiment of the invention to deviate from the (calculated and optimal) working distance 141 of the alignment unit 119 from the real intermediate image 115, wherein the actual working distance 541a is greater than the free working distance 142 of the alignment unit 119, but is not necessarily greater than the focal length 571 of the front lens 139.

Preferably and also independently of one of the above-described specific implementations, an alignment unit according to an embodiment of the invention can also be designed so that imaging errors such as vignetting and color errors (chromatic aberrations) are substantially corrected for the actual working distance 541a, but spheric aberrations occur.

Figure 6:
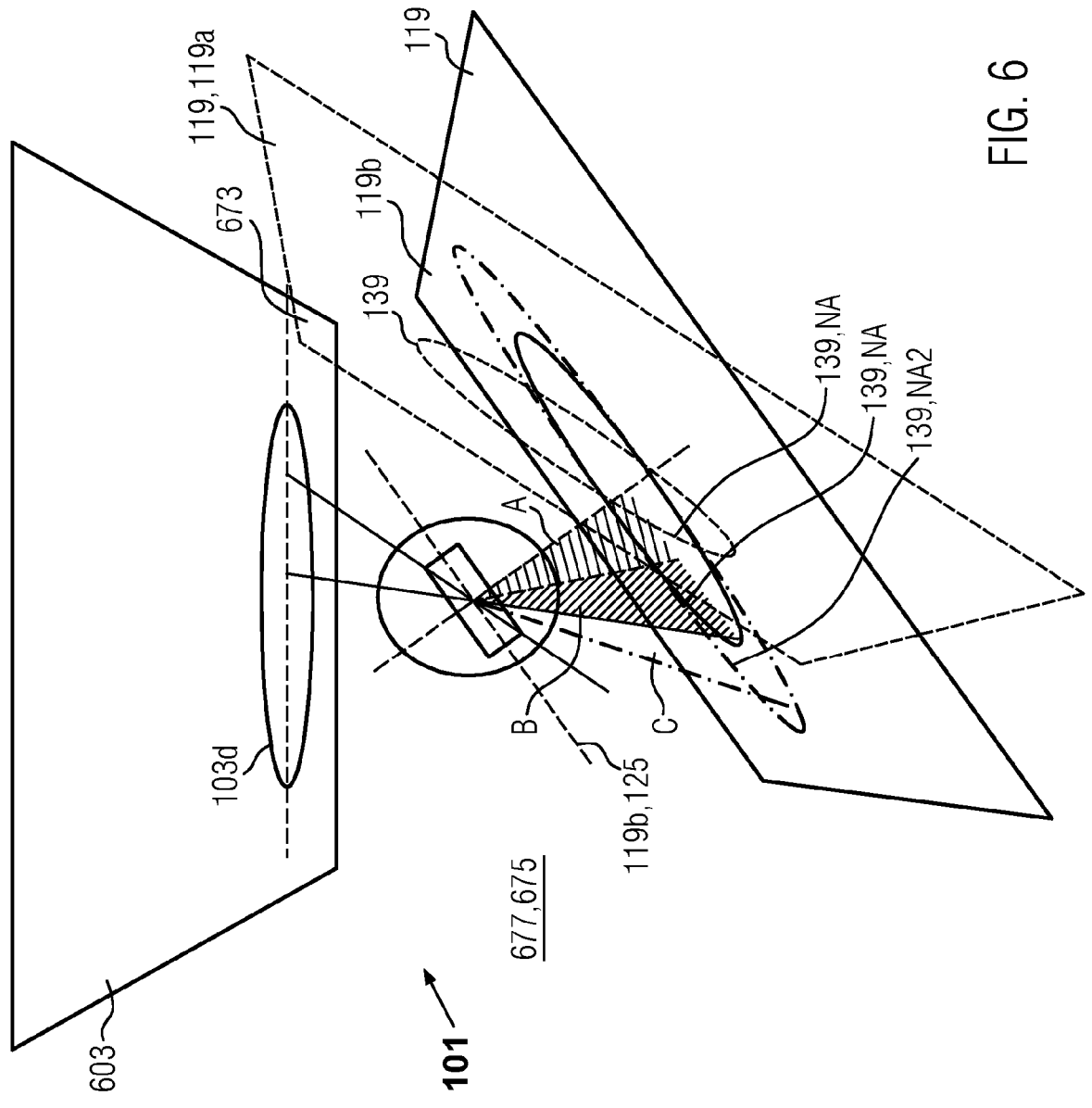
FIG. 6 shows a schematic illustration of an inclined plane microscope to illustrate a detection light cone.

Parts of the inclined plane microscope 101 according to an embodiment of the invention are schematically shown in FIG. 6 to explain the steps to increase the collection efficiency of the alignment unit 119. In FIG. 6, only the second detection optical unit 103d of the detection assembly 103 and only the front lens 139 of the alignment unit 119 are schematically indicated.

The alignment unit 119 is shown both in the classic arrangement 119a and in the tilted arrangement 119b. In the classic arrangement 119a, the detection assembly 103 and the alignment unit 119 can touch in a collision region 673.

According to an embodiment of the invention, such a collision of the two components 103, 119 is avoided by the tilt of the alignment unit 119 toward the optical axis 133 of the detection assembly 103. Such a tilted arrangement 119b is shown by a solid line for differentiation.

Moreover, a further possibility for further increasing the light yield is shown in FIG. 6. This is enabled by the selection of a front lens 139 having a second numeric aperture NA2, which is usable in this larger form, since a clearance between the detection assemblies 103 and the alignment unit 119 would be enlarged due to the tilt.

The respective second detection light cone 219c is therefore enlarged from that for the classic arrangement 119a, this is marked for the sake of clarity with a capital letter A, to form the second detection light cone 219c, which is achieved for the tilted arrangement 119b, this is marked by a capital letter B, wherein the latter can be enlarged still further by an enlarged numeric aperture NA2 of the front lens 139 or the alignment unit 119, the enlarged second detection light cone 219c is marked here by a capital letter C. The light cone A is enclosed in B, and A and B are enclosed in the light cone C.

A further possibility for increasing the numeric aperture NA of the alignment unit 119 can be to introduce an immersion medium 675 between the detection assembly 103 and the alignment unit 119, which has a refractive index 677 that is greater than the refractive index 677 of air. This can be a liquid such as an oil, for example.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

101 inclined plane microscope
103 detection assembly
103a lens
103b objective
103c first detection optical unit
103d second detection optical unit
104 telescope
105 scattered and/or fluorescent light
105a sample-side detection light cone
205a image-side detection light cone
107 light sheet
107a illumination light
107b mirror assembly
109 illuminated region
111 sample volume
111a sample side
111b sample
111c refractive index of the sample
113 side facing away from the sample volume
115 real intermediate image
117 focal plane 119 optical alignment unit
119a classic arrangement of the alignment unit
119b tilted arrangement of the alignment unit
219c second detection light cone
219d light cone of the alignment unit
121 predetermined image field
121a width
123 detector
125 focal plane
127 offset angle
127a acute angle
129 depth of field region
129a enlarged region
129b depth of field
131 optical axis of the alignment unit
131a classic arrangement of the optical axis
131b positioning of the optical axis
133 optical axis of the detection assembly
135 immersion optical unit
139 front lens
141 working distance
142 free working distance
343 filter
345 pupil filter
347 phase mask
349 amplitude mask
351 beam path
353 modified beam path
355 further optical elements
357 PC
359 evaluation device
361 postprocessing module
363 image data
465 microlens array
465a microlens
567 calculated optimum position
569 changed position
571 focal length of the front lens
673 collision region
675 immersion medium
677 refractive index
f focal length

The invention claimed is:

1. An inclined plane microscope comprising:
a detection assembly for collecting scattered light and/or fluorescent light from regions of a sample volume that are illuminated by a light sheet, wherein the detection assembly, on its side facing away from the sample volume, is configured to image a real intermediate image of the regions of the sample that are illuminated by the light sheet, and wherein the real intermediate image is tilted in relation to a focal plane of the detection assembly; and
an optical alignment unit for imaging a predetermined image field of the real intermediate image onto a detector, wherein the alignment unit has a depth of field region,
wherein an optical axis of the alignment unit is oriented at an acute angle in relation to the real intermediate image, and
wherein the predetermined image field of the real intermediate image to be imaged by the alignment unit is located completely within the depth of field region.

2. The inclined plane microscope as claimed in claim 1, wherein the real intermediate image is arranged diagonally in the depth of field region.

3. The inclined plane microscope as claimed in claim 1, wherein the optical axis of the alignment unit is tilted toward the optical axis of the detection assembly.

4. The inclined plane microscope as claimed in claim 1, wherein the alignment unit has at least one immersion optical unit.

5. The inclined plane microscope as claimed in claim 1, wherein the alignment unit has a phase mask and/or an amplitude mask.

6. The inclined plane microscope as claimed in claim 1, wherein the alignment unit comprises at least one lens, a position of which in relation to the real intermediate image deviates from an aberration-minimized position of the lens, in which the alignment unit has one or more least possible aberrations upon imaging of the real intermediate image on the detector.

7. The inclined plane microscope as claimed in claim 6, wherein the alignment unit comprises two lenses, wherein a working distance of the alignment unit in relation to the real intermediate image is set so that it deviates from a focal length of a front lens of the two lenses arranged closer to the real intermediate image.

8. The inclined plane microscope as claimed in claim 1, wherein the alignment unit comprises a microlens array.

9. The inclined plane microscope as claimed in claim 1, comprising a detector, the detector comprising a plurality of pixels, wherein a pixel size of each pixel is equal to or less than half of a scattering circle diameter, wherein the scattering circle diameter results from the depth of field region, a focal length and an f-stop of the alignment unit, and a working distance in relation to the real intermediate image.

10. A method for recording images representing planes of a sample using the inclined plane microscope according to claim 1, the method comprising:
collecting scattered light and/or fluorescent light from regions of a sample volume, that are illuminated by a light sheet, using a detection assembly;
generating a real intermediate image of the regions of the sample volume that are illuminated by the light sheet using the detection assembly, wherein the real intermediate image is tilted in relation to a focal plane of the detection assembly; and
imaging a predetermined image field of the real intermediate image on a detector by way of an optical alignment unit,
wherein an optical axis of the alignment unit is oriented at an acute angle in relation to the real intermediate image, wherein the predetermined image field of the real intermediate image is located completely within a depth of field region of the alignment unit.

11. The method as claimed in claim 10, further comprising reduction of artifacts by at least one of:
unfolding recorded images using a modified PSF; and
Computational Clearing of the recorded images.

12. The method as claimed in claim 10, further comprising re-sorting of recorded image data, so that each obtained image represents a plane which is oriented perpendicular to the optical axis of the detection assembly.

13. A method for imaging with an alignment unit in the inclined plate microscope according to claim 1, the method comprising:
imaging a predetermined image field of a real intermediate image generated by a detection assembly on a detector, wherein the real intermediate image is tilted in relation to a focal plane of the detection assembly,
wherein the alignment unit has a depth of field region,
wherein an optical axis of the alignment unit is oriented at an acute angle in relation to the real intermediate image, and wherein the predetermined image field of the real intermediate image to be imaged by the alignment unit is located completely within the depth of field region.

\* \* \* \* \*